United States Patent [19]

Schürmann et al.

[11] 3,971,764

[45] July 27, 1976

[54] PROCESS FOR PRODUCING A CATIONIC POLYURETHANE

[75] Inventors: Horst Schürmann; Josef Bung, both of Duren, Germany; Hendrikus Alouisius Van Aalten, Zevenaar, Netherlands

[73] Assignee: Akzona Incorporated, Asheville, N.C.

[22] Filed: Dec. 26, 1974

[21] Appl. No.: 536,365

[52] U.S. Cl. ............... 260/77.5 AM; 260/77.5 Q; 428/425
[51] Int. Cl.² ............................ C08G 18/38
[58] Field of Search ............... 260/77.5 AQ, 18 TN, 260/77.5 Q

[56] References Cited
UNITED STATES PATENTS

| | | | |
|---|---|---|---|
| 3,436,361 | 4/1969 | Wooster | 260/18 TN |
| 3,479,310 | 11/1969 | Dieterich et al. | 260/850 |
| 3,480,592 | 11/1969 | Dieterich et al. | 260/32.4 |
| 3,491,050 | 1/1970 | Keberle et al. | 260/18 TN |
| 3,499,852 | 3/1970 | Schroeder et al. | 260/18 TN |
| 3,637,540 | 1/1972 | Wolff et al. | 260/18 TN |
| 3,726,838 | 4/1973 | Eimen et al. | 260/77.5 AQ |
| 3,792,023 | 2/1974 | Havenith et al. | 260/77.5 AQ |

*Primary Examiner*—M. J. Welsh
*Attorney, Agent, or Firm*—Francis W. Young; Philip M. Pippenger

[57] ABSTRACT

Cationic polyurethanes and a process for their production wherein a polyisocyanate, preferably a diisocyanate such as 2,4- or 2,6-tolylene-diisocyanate is reacted with an aliphatic dihydroxy compound substituted with an aliphatic side-chain of at least 10 carbon atoms to form a preliminary adduct or so-called prepolymer with terminal —NCO groups. This prepolymer is then reacted for chain-lengthening with an aliphatic monomeric diol (A) containing a tertiary nitrogen atom convertible into an ammonium compound or an aliphatic monomeric diol (B) containing a tertiary nitrogen atom already converted into an ammonium compound. The new cationic polyurethanes are especially useful as sizing agents for the sizing of paper.

24 Claims, No Drawings

PROCESS FOR PRODUCING A CATIONIC POLYURETHANE

Cationic polyurethane polymers have been known for a long time. In a broad sense, such polymers are to be understood as any polyurethane in which the polymer molecule contains one or more atoms having a positive charge. These polymers can be obtained, for example, by proceeding from monomeric compounds containing atoms or groups capable of onium formation.

The production of a cationic polyurethane is described in German Patent No. 880,485. In this case, the compounds are produced in the following manner. For example, one may use a glycol which contains members such as tertiary nitrogen or ether oxygen atoms which are capable of providing onium groups. This glycol is reacted with an equivalent amount of a diisocyanate, and the product obtained in this manner is treated with polyfunctional or possibly with monofunctional alkylating agents.

From German Patent No. 891,742, it is further known that a polyisocyanate prepolymer can be produced from polyesters which contain terminal hydroxy groups, and this prepolymer is then reacted with dihydroxy compounds which contain the atoms or groups which will form onium groups. Still further cationic polyurethanes are described in the German Laid-Open Specification (DOS) No. 1,595,602 and in the paper by D. Dieterich et al in Angewandte Chemie, Vol. 82 (1970), Part 2, pages 53–63.

These cationic types of polyurethane compounds are well known for use as textile auxiliary agents or dyeing assistants and also for the synthesis of thickening agents. They may also be used for the production of polymers with rubber-like properties, dimensionally stable plastic coatings, soft adhesive substances or even brittle "duroplasts". The cationic polyurethanes are generally useful for coatings and the coating and/or impregnation of a wide variety of woven and non-woven materials including textiles, leather, paper, wood, metal or metal foils, ceramics, stone, concrete, bitumin, hard fiber, straw, glass, porcelain or plastics of the widest variety.

The cationic polyurethanes are also used in antistatic and crease-proofing finishes and as binders for fleeces, webs or non-woven textiles. They are also useful in providing adhesives, cohesion agents, covering agents, hydrophobic agents, softeners or plasticizers, or bonding agents as required for cork particles, sawdust, glass fibers, asbestos, paper-like materials, plastic or rubber scrap materials, ceramic materials, or the like. These cationic polyurethanes are also employed as auxiliary agents in fabric printing and in the paper industry, for example as additives to polymer dispersions, as coating agents, as finishes for leather, and as sizing agents for paper.

Although there are already a very large number of cationic polyurethanes described in the prior art, there is still a need for new polymers of this type because their production is often associated with certain difficulties and also the properties of the known polyurethanes are unsatisfactory for certain uses so as to be in need of substantial improvement.

It has now been found, in accordance with the present invention, that a cationic polyurethane with surprising outstanding properties can be produced by the steps of converting a monomeric aliphatic dihydroxy compound, which has an aliphatic side-chain substituent of at least 10 carbon atoms, by reaction with a polyisocyante into a preliminary adduct with terminal —NCO groups; and chain-lenghtening said adduct by reacting with terminal —NCO groups with (A) an aliphatic monomeric diol containing a tertiary nitrogen atom which is subsequently converted into the corresponding ammonium compound, or (B) an aliphatic monomeric diol containing a nitrogen atom previously converted into the corresponding ammonium compound.

The term "ammonium compound" is employed herein to refer to the salts of tertiary amines or quaternary ammonium salts, both of which contain a positively charged nitrogen atom. The salts of tertiary amines add a hydrogen atom to the nitrogen by reaction with an acid, preferably an inorganic acid such as HCl, for example, so that the positively charged nitrogen atom as the cation is associated with the negatively charged chlorine atom of the hydrogen chloride.

The monomeric aliphatic-substituted dihydroxy compounds used to form the preliminary adduct or isocyanate-containing prepolymer are those in which the aliphatic side-chain must contain at least 10 carbon atoms and preferably about 16 up to 22 carbon atoms. These dihydroxy compounds serving as initial monomers for purposes of the present invention are preferably non-polymeric aliphatic glycols, i.e. organic compounds with two hydroxy groups in the 1,2-position or the 1,3-position or in another position, e.g. the $\alpha,\omega$-position. It is especially preferred to use those aliphatic glycols which contain not more than 7 atoms in the chain connecting the two hydroxy groups.

The aliphatic side-chain substituted on the dihydroxy compound can be located on a carbon atom which carries one of the hydroxy groups but it is preferably located on a carbon atom found in the main-chain between the two carbon atoms which bear the functional hydroxy groups. This aliphatic side-chain contains from 10–22 and preferably 16–22 carbon atoms.

The term "aliphatic" is employed herein to refer to an essentially hydrocarbon structure apart from designated functional groups, with the proviso that this hydrocarbon structure may be interrupted by one and not more than two hereto atoms, e.g. an oxygen atom, a nitrogen atom and/or a carbonyl group (—CO—). Thus, it is not absolutely necessary that the aliphatic main-chain of the glycol, i.e. the chain extending between the two hydroxy groups, contains only carbon atoms because this chain may also be interrupted by a nitrogen atom as in a dihydroxy-substituted dialkylamine or by an oxygen atom as in a dihydroxy-substituted dialkylether. Where the hereto atom is nitrogen in this mainchain, it preferably carries the aliphatic side-chain of 10 to 22 and preferably 10 to 16 carbon atoms.

The preferred aliphatic main-chains are those of 2 to 7 atoms selected from the group consisting of alkylene and dialkyleneamine with the side-chain preferably being alkyl connected to a carbon atom of said alkylene or to the nitrogen atom of said dialkyleneamine.

When a hetero atom is located in the aliphatic chain of the dihydroxy compound, it will be understood that this hetero atom may not contain any reactive member or group which would react with the isocyanate groups of the polyisocyanate monomer. For example, where a nitrogen atom is in the aliphatic chain, its third valence must be substituted by a hydrocarbon radical without any active hydrogen atom, thereby providing a tertiary nitrogen atom free of hydrogen atoms.

The aliphatic substituent or side-chain on the dihydroxy compound must contain at least 10 and preferably at least 16 carbon atoms. Again, it is not essential that this side-chain must be composed of only carbon and hydrogen atoms in a hydrocarbon structure. In this case, the aliphatic substituent may also include one or two hetero atoms, preferably an acyloxy group such as alkyl-COO— in which the alkyl group contains at least 9 and preferably at least 15 carbon atoms. Especially suitable dihydroxy compounds are thus obtained as the fatty acid monoesters of glycerol, for example glycerol monostearate or the behenic acid monoester of glycerol.

Other suitable dihydroxy compounds with a hetero atom in the main-chain are especially the N-substituted dialkanolamines such as N-stearyl-diethanolamine where the stearyl group is the side-chain, i.e. an alkyl group of 18 carbon atoms. Each alkanol member preferably has 2 to 3 carbon atoms so that the preferred compounds have the formula

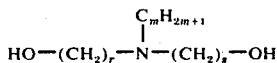

wherein $r$ and $s$ each denotes 2 or 3 and $m$ is an integer of 10–22 and preferably 16–22.

Still other useful dihydroxy compounds of special value having the required number of carbon atoms in the side-chain are those derived from branched chain dihydroxy-alkylene compounds, for example 1,2-dihydroxyoctadecane and 1,4-dihydroxyoctadecane which have been found to be especially suitable in the present invention.

The polyisocyanates, which serve as the other monomeric reactant in the formation of the preliminary adduct or so-called prepolymer, may be an aromatic or aliphatic compound or else one can use mixed, aliphatic/aromatic compounds. It is preferred that the polyisocyanate monomer is selected as one which is essentially difunctional, i.e. a diisocyanate, so as to form essentially linear prepolymers and eventually a linear cationic polyurethane. These polyisocyanates and especially the diisocyanates are well known in the polyurethane art, for example as disclosed in books such as "Polyurethanes" by Dombrow, Reinhold Publ. Corp., New York (1957). The following diisocyanates are especially preferred:

tolylene diisocyanate (the isocyanate groups being substituted in the 2,4- or 2,6- positions or using mixtures of both of these isomers);
diphenylmethane-4,4'-diisocyanate;
hexamethylene-diisocyanate.

One may also use, however, the so-called masked diisocyanates which are obtained for instance as the reaction product of diphenylmethane-4,4'-diisocyanate with two mols of phenol.

As triisocyanates which are useful within the scope of the invention, one can select the addition product of glycerol and three mols of tolylene diisocyanate as well as tri-(4- isocyanatophenyl)-monothiophosphate. When using polyisocyanates of more than two isocyanate groups (—NCO) in the molecule, it is preferable to admix them with a larger proportion of diisocyanates. If one uses only the polyisocyanates of three or more —NCO groups or mixtures with a larger proportion of these polyisocyanates as compared to the diisocyanates, then uncontrollable cross-linking may easily take place. The diisocyanates therefore are preferably used in a proportion of at least about 75% and especially 90% or more in comparison to the tri- or higher poly-functional isocyanates.

Again, it is emphasized that one preferably prepares linear prepolymers and polyurethanes so that the diisocyanates are most valuable for this purpose while other polyisocyanates may then be used only with extreme care.

The proportions of the two monomers, namely the molar ratio of the dihydroxy compound to the polyisocyanate, can be varied over a relatively broad range. For example, one can work with a molar ratio of dihydroxy compound to diisocyanate of 1:1.1 to 1:3. An especially preferred range of this molar ratio is about 1:1.5 to 1:2.5. The most preferred molar ratio is approximately 1:2.

The reaction of the monomeric aliphatic dihydroxy compound with the monomeric polyisocyanate is best carried out in a water-free organic solvent, preferably in acetone. Other solvents may also be used as the reaction medium, i.e. so as to provide a continuous liquid phase, to the extent that the solvent is inert to the isocyanate groups and is compatible with all of the reaction components. One may also select the solvent on the basis of its boiling point so as to establish a reaction temperature under reflux conditions. Solvents other than acetone found to be especially useful are:
tetrahydrofuran;
dimethylformamide;
chloroform;
perchloroethylene;
methylene chloride;
methyl ethyl ketone;
ethyl acetate; and
dimethyl sulfoxide.

The reaction of the aliphatic substituted dihydroxy compound with the polyisocyanate, and especially a diisocyanate, may also take place on the other hand without using a solvent as a liquid reaction medium but instead by using the two monomers in a melt of at least one of the monomers.

Catalysts can be used for reacting the dihydroxy compound with the polyisocyanate. Suitable catalysts include such compounds as diacetoxy-dibutyl-tin which shows an especially favorable action. Other catalysts may be listed as follows:
dibutyl tin dilaurate;
cobalt naphthenate;
zinc octoate;
tertiary amines such as triethylamine; 1,4-diaza-(2,2,2)-bicyclooctane.

As a catalyst for the preparation of the preliminary adduct or prepolymer, one may also select the diol containing a tertiary nitrogen atom as subsequently used in the chain-lengthening step. In this case, only a small proportion of this diol, e.g. a dialkanolamine, is required as the catalyst in making the prepolymer, it being possible to use less than about 5% by weight of the same diol required for the chain-lengthening step.

One may also achieve satisfactory results without using a catalyst but a longer reaction time is then required.

The prepolymer obtained in the first reaction stage of the invention is then further reacted in a second stage with approximately equivalent amounts of an aliphatic diol containing a tertiary nitrogen atom in order to chain-lengthen the prepolymer. The use of "equivalent amounts" means that one provides the same number of hydroxy groups of the diol reactant as there are isocyanate groups present in the prepolymer.

As aliphatic diols containing a tertiary nitrogen atom, especially good results have been achieved with N-methyl-diethanolamine and 1,2-propanediol-3-dimethylamine. It will be understood, however, that other diols with a tertiary nitrogen may also be used, for example:

N-n-butyl-diethanolamine;
N-t-butyl-diethanolamine;
N-methyl-dipropanolamine;
N,N-bis-(2-hydroxyethyl)-p-toluidine;
1,4-bis-(2-hydroxyethyl)-piperazine.

The diol preferably contains only one or at most two tertiary nitrogen atoms, and its molecular weight is generally less than 300 and preferably less than 200. The term "chain-lengthening" is commonly used in this art to identify the reaction of this diol with the prepolymer.

The reaction of the prepolymer with the chain-lengthener, i.e. the diol with a tertiary nitrogen, preferably takes place in a water-free solvent, acetone again being especially useful. It is also most preferred to accomplish the chain-lengthening at the boiling temperature of the reaction medium. The course of the reaction can be followed by the known technique of isocyanate determination. Toward the end of the reaction, the content of the isocyanate groups becomes less than 1%.

The chain-lengthened product is then converted into an ammonium compound, i.e. it is rendered cationic by providing a positive charge on the tertiary nitrogen atoms. Thereby, the previously free electron pair of the tertiary nitrogen is given an electrovalent bond, i.e. so that nitrogen then carries a positive charge and the polyurethane becomes cationic in character. For this step, the reactive hydrogen of a suitable acid or an alkyl group of a suitable alkylating agent can be attached to the tertiary nitrogen atom.

If desired, this procedure for imparting a positive charge to the tertiary nitrogen atom can be carried out in advance, i.e. by using a diol for the chain-lengthening step which has been previously reacted on its tertiary nitrogen with an acid or alkylating agent to transform it into the corresponding ammonium compound. For example, N-methyl-diethanolamine may first be reacted with hydrogen chloride to form the corresponding N-methyldiethanol ammonium chloride which is then used directly as the chain-lengthener to form the cationic polyurethane from the prepolymer.

The conversion of the chain-lengthened product into an ammonium compound is preferably accomplished with hydrogen chloride. One may use aqueous HCl but it is also possible to introduce HCl as a gas or as a non aqueous solution. An acetonic HCl-solution is thus very useful for this method of obtaining the ammonium compound.

The conversion into the ammonium compound can also be accomplished with a conventional alkylating agent. Dimethyl sulfate is especially useful for this purpose. Very favorable results are obtained if the reaction with hydrogen chloride is carried out with a portion of the HCl being replaced by dimethyl sulfate. This permits one to achieve a product in which at least part of the tertiary nitrogen atoms do not contain hydrogen attached thereto but instead a methyl group.

It is especially advantageous if the conversion into an ammonium compound, i.e. into the cationic form of the polymer, is carried out by adding only so much acid or so much alkylating agent that 45 to 200 milliequivalents of the tertiary nitrogen atoms per 100 grams of polymer are converted into the ammonium or positively charged state. The amount of acid or alkylating-agent required to provide a value in this range is very easily calculated on the basis of the added amounts of the initial materials.

It is also especially favorable to subject the chain-lengthened product to an intermediate drying before it is converted into an ammonium compound. As such an intermediate drying, any suitable method of treatment may be used which will permit the separation of the added solvent or residues of other liquids. Spray drying has been found to be especially useful, but one may also dry the product in a heated rotary drum or the like.

The intermediate dry product can then be suspended for a given time, for example in water, and converted into the ammonium compound by adding hydrochloric acid. In the use of acids such as hydrochloric acid, it is preferable not to add the acid all at once but instead to add it slowly dropwise to the chain-lengthened product.

A further object of the invention is to provide the cationic polyurethanes obtained as the product of the processes disclosed hereinabove. These products may be defined as those obtained by reaction of a monomeric aliphatic dihydroxy compound, which has an aliphatic side-chain substituent of at least 10 and preferably at least 16 up to about 22 carbon atoms, with a polyisocyanate, preferably a diisocyanate into a preliminary adduct followed by chain-lengthening this preliminary adduct with an aliphatic diol which contains a tertiary nitrogen atom and then converting the chain-lengthened product into an ammonium compound by treatment with an acid or an alkylating agent. Alternatively, the chain-lengthening can be carried out with said aliphatic diol in which the tertiary nitrogen has already been reacted to form the ammonium compound.

The new cationic polyurethanes of the invention are generally obtainable using all of the initial monomeric reactants described above in connection with the process of the invention.

Particularly useful cationic polyurethanes according to the invention can be formed of structural units of the general formula

ABAD wherein the individual units of the structure have the following meaning:

A is $\{CO-NH-R-NH-CO\}$;

R being the hydrocarbon radical of a diisocyanate;
B is a member selected from the group consisting of

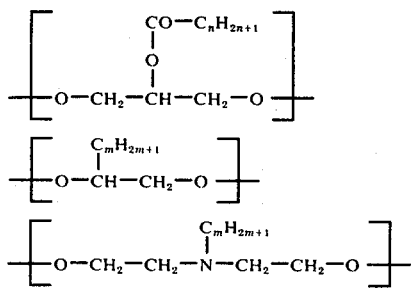

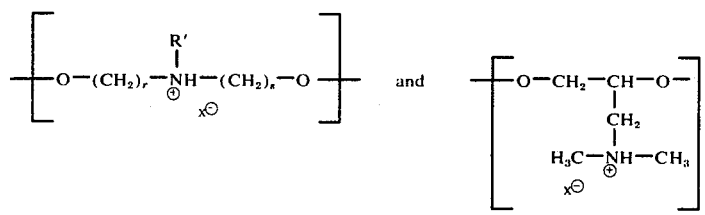

n being an integer of from 9 to 21 and m being an integer of from 10 to 22; and

D is a member selected from the group consisting of

 and 

R' being lower alkyl of 1 to 4 carbon atoms, r and s each being an integer of 2 to 6 and r + s being not more than 6, $X^\ominus$ being the anion of an acid, preferably $Cl^\ominus$.

Especially good results have been achieved when R is the divalent 2,4- or 2,6-tolylene radical, i.e. as derived from the corresponding tolylene-diisocyanates. However, satisfactory results have also been achieved with a cycloaliphatic diisocyanate such as bis-(4-isocyanato-cyclohexyl)-methane or an aliphatic diisocyanate such as hexamethylene-diisocyanate.

In the above-noted structural formula ABAD, the unti A is derived from a diisocyanate and is set forth within brackets above as a divalent radical as it would occur within the linear polymer chain. It will be readily understood by one skilled in this art that the unit A when placed at the terminal end of the polymer chain will provide a terminal isocyanate function, i.e. it will have the isocyanate group

O=C=N— attached to R rather than the divalent amido group

—CO—NH—.

The analogous situation occurs with the structural unit D which is derived from the diol and is illustrated above as being contained within the polymer chain. When in a terminal position, D will of course have a hydroxy terminal group.

The terminal groups of the polymer, whether isocyanate or hydroxy groups, may also be changed by suitable secondary reactions, e.g. by the addition of chain-terminating agents or the like.

For purposes of the present invention, it is especially desirable to produce the cationic polyurethane with a molecular weight in the range of about 3000 – 20.000, preferably 4000 – 8000.

The process of the invention leads to cationic polyurethanes with outstanding properties in a very simple and advantageous manner. The reaction proceeds practically quantitatively. It results in no by-products or undesirable impurities. Also, no undesirable cross-linking takes place. The recovery of the optionally added solvent is quite simple. The individual reactions proceed quite rapidly so that high yields and high rates of conversion are possible. The successive reaction steps up to the final cationic polyurethane can be carried out one after the other in different reaction vessels or stages. However, it is also possible to carry out the individual reactions in a single vessel. It is also possible to simultaneously react the initial materials required for the formation of the cationic polyurethane of the invention. Thus, the chain-lengthened product in particular can be produced in a so-called single-pot or single-top process. Preferably, however, the preliminary adduct or polyisocyanate prepolymer is first formed in a first stage and then subjected to chain-lengthening in a separate second stage.

Through the choice of suitable initial materials, the properties of the cationic polyurethanes of the invention can be varied within a broad range. In general, the use of aromatic diisocyanates leads to cationic polyurethanes of better sizing properties. By varying the proportion of the nitrogen atoms, which are to be converted into the corresponding ammonium groups, the particle size of the polyurethane can be strongly influenced so that it becomes possible to predetermine the size of the polymer particles as being loosely dispersed, finely dispersed or even dispersed in a collodial form, i.e. a collodial suspension.

The basicity of the polyurethanes of the invention, is generally higher if chain-lengtheners are added in which the tertiary nitrogen or ammonium nitrogen group is not placed directly in the linear chain between the two hydroxy groups. Thus, as one example of providing higher basicity, it is possible to use 1,2-propanediol-3-dimethylamine with especially good results.

The cationic polyurethanes obtained in this invention are very stable in storage. They can be prepared as solutions or dispersions. They are readily diluted with conventional solvents or additives. They can be processed into shaped structures, especially films, and they are also suitable as coatings or finishes for plastics or synthetics of the most diverse types.

Most importantly, it has been found in accordance with the invention that the new cationic polyurethanes are exceptionally valuable sizing agents for paper. It is therefore a further object of the invention to provide a sizing agent for paper and the resulting sized paper product in which the essential sizing agent consists essentially of the new cationic polyurethane as defined herein, especially those polymers identified by the formula ABAD.

Thus, these polyurethanes have been found useful as a mass or internal sizing agent as well as a surface sizing agent for cellulosic especially paper which is composed predominately or entirely of ccellulosic fibers. One may also apply these sizing agents simultaneously as surface and internal sizers. On the other hand, it is also possible to carry out an internal sizing with conventional sizers such as resin sizing agents and then apply the cationic polyurethanes of the invention only as a surface sizing agent. The cationic polyurethanes may be readily incorporated in known sizing compositions, e.g. those using oxidized starch or the like as a conventional component.

Further details concerning the sizing of paper can be taken for example from such books as "Das Leimen von Papier" by Engelhard et al, VEB Fachbuch-Verlag Leipzig (1972) or "Pulp and Paper Manufacture", Volume III-Papermaking and Paperboard Making, Second Edition, McGraw-Hill Book Co. (1970).

With the cationic polyurethanes of the invention, it is possible to size paper over a very broad pH-range so that chalk may also be advantageously incorporated into the sizing composition as a filler. The compatibility of the polyurethanes of the invention with alum is excellent. It is especially well used when processing with products added in a conventional manner for the improvement of the surface characteristics of the paper such as starch which may be oxidized or enzyme-degraded starch or chemically modified starch. Other useful additives of this kind include cellulose derivatives such as carboxymethyl-cellulose or cellulose ether, polyvinyl alcohol, alginates, etc. See especially pages 75-77 of "Pulp and Paper Manufacture", Vol. III, supra.

With the addition of the cationic polyurethanes produced according to the present invention as the essential sizing agent, a very favorable sliding friction is obtained in the paper product so that in further processing, e.g. in the stacking of the paper for storage, no serious difficulties arise due to a reduction in this sliding friction. Papers which have been sized with the new sizing agents of this invention exhibit excellent processing properties on the take-off or conveying rolls, cutters and similar paper treating apparatus.

With the cationic polyurethanes of the invention, a very good sizing degree or grade of sizing is achieved. It is of special advantage that the sizing effect appears instantaneously and, once achieved, remains constant over very long periods of storage. This is of very great significance above all with coated stock papers because it is essential during later processing to achieve a continuously uniform staining or coloration with conventional printing or coloring inks.

Both in the production of the cationic polyurethane and also in its use as a sizing agent for paper, practically no problems arise with respect to waste waters. It is to be especially emphasized that the formation of foam is largely avoided when using the cationic polyurethane of the invention either as an internal sizing agent in the beater at the wet end of the paper making machine or as a surface sizing agent.

The sizing fastness of the product is also very good so that one can use substantially smaller amounts of the sizing agent as compared to known products. The initial monomeric materials are readily available so that production of the cationic polyurethanes can be carried out on a large commercial scale without difficulty.

The cationic polyurethanes of the invention are generally applied to the paper using any of the conventional techniques common to the paper making process. The rate of application and the amount applied is very easy to control. One can thus obtain paper products sized with the cationic polyurethanes of the invention in the form of full internal sizing, three-quarters sizing, half-sizing or one-quarter sizing as well as even lighter surface applications.

These and similar advantages of the invention in terms of the process, the resulting cationic polymer products and their sizing applications will become more apparent from the examples below. Percentages are by weight hereinafter unless otherwise voted.

The invention is further illustrated by the following examples wherein measured values are obtained according to routine procedures:

1. The sizing degree as a measure of resistance to writing inks is obtained with a Hercules Sizing Tester in accordance with the instructions given by the firm of Hercules Incorporated, Wilmington, Delaware, U.S.A. The time is measured in seconds which elapses for a drop of the remission up to 80% of the remission value of the paper, when the test ink is brought onto the paper and blotted or absorbed by the paper.

The test ink used is the paper test ink, blue, prescribed by German Industrial Standard (DIN) 53126.

2. The Cobb Test, using DIN-Standard 53/32 of 1 minute:

a. Absorption capacity for water, expressed in g/m$^2$ of water take-up after 1 minute contact with water.

b. Absorption capacity for a 10% $Na_2CO_3$ (soda) solution, expressed in g/m$^2$ of take-up after 1 minute as in 2(a).

Further details as to the measuring procedures are given in the above-mentioned book by Engelhardt et al.

EXAMPLE 1

As apparatus, there is used a heatable, 500 ml capacity, three-necked flask which is equipped with a stirrer, a reflux condenser with a drying tube a nitrogen inlet and also a dropping funnel.

19.5 g glycerol monostearate of a commercial grade (0.0545 mol) is placed in the flask. In succession, there is added 15 mg of dibutyl tin diacetate, 24 ml of water-free acetone and 16.0 ml (19.5 g or 0.112 mol) of a mixture of toluene-diisocyanate - (2,4) and - (2,6).

The reaction vessel is then heated for about 30 minutes so that there is a light reflux of the solvent. During this time, the reaction temperature amounts to about 62°C.

Thereafter, within about 10 minutes, a solution of 6.5 g of N-methyl-diethanolamine (0.0546 mol) in 20 ml of water-free acetone is added dropwise and heating is again carried out in such a manner that a moderate reflux is maintained. After 60 minutes reaction time, the NCO-content falls below about 1.5%, and a fairly viscous, water-clear solution of the polyurethane is formed which is diluted with 160 ml of technical grade acetone.

For the salt formation, there are added 27.3 ml of a 2-normal hydrochloric acid over a period of about 5 minutes. Hereby the salt is present in partly colloidial form as a white precipitate which is brought into solution while 140 ml of water is introduced over a period of 15 minutes, the contents of the flask being maintained at a temperature of about 50°C. The resulting clear solution is freed of acetone by vacuum distillation.

There results a 20% by weight, slightly opalescent, light yellow dispersion of the polyurethane ionomer.

By further distilling off water from this solution, the concentration of this ionomer can be increased. At 32% by weight concentration, the polymer dispersion is still quite fluid.

EXAMPLE 2

The same procedure is followed as in Example 1, except that 6.0 g of N-methyl-diethanolamine are used rather than 6.5 g and 25.2 ml of the 2N HCL are used for the salt formation. The polyurethane is not further diluted with acetone upon addition of the hydrochloric acid. The addition of water occurs as in Example 1. There is formed a bluish, glistening dispersion with an average particle size of 0.5 – 1 $\mu$m (micron).

EXAMPLE 3

The procedure of Example 2 is followed except that the chain-lengthened product is subjected to an intermediate spray drying. This intermediate dried product exhibits a melting point of 93°C. For conversion into an ammonium compound, the intermediate dried product is suspended in water and the hydrochloric acid then slowly added.

EXAMPLE 4

The procedure of Example 1 is followed except that the reaction between the glycerol monostearate and the toluene-diisocyanate is catalyzed by 3% of the total amount of the N-methyl-diethanolamine, deducted from that used in the chain-lengthening step. A product is obtained substantially as in Example 1.

EXAMPLE 5

The procedure of Example 1 is followed except that immediately after the dissolution of the glycerol monostearate and the toluene-diisocyanate and without any previously catalyzed reaction of these components by addition of organo-tin compounds, tertiary amines or similar active substances, the acetonic solution of N-methyl-diethanolamine is added dropwise. The reaction time amounts to 2 hours. The dispersion of the resulting ionomer is slightly cloudy.

EXAMPLE 6

19.5 g of glycerol monostearate is placed in the flask and heated up to its melting point. Next, 16 ml of toluene-diisocyanate is added dropwise in such a manner that the temperature does not rise over 75°C. After completion of the exothermic reaction, the mixture is stirred for another 20 minutes at 75°C. the melt is then brought into solution by addition of 50 ml of water-free acetone. The further reaction with N-methyl-diethanolamine, salt formation and dispersion are accomplished as in Example 1 to provide a very similar polyurethane ionomer.

EXAMPLE 7

The procedure of Example 1 is followed except that 8.0 g of N-butyl-diethanolamine are used in place of the 6.5 g of N-methyl-diethanolamine. There is obtained a finely divided, opalescent dispersion of the polymer.

EXAMPLE 8

The procedure of Example 1 is followed except that 29.4 g of bis — (4-isocyanato-cyclohexyl) — methane are used in place of the 19.5 g of toluene-diisocyanate. A lightly opalescent dispersion of the polymer is obtained.

EXAMPLE 9

The procedure of Example 1 is followed except that the neutralization of the tertiary nitrogen is carried on only up to 80% (with reference to the total number of tertiary nitrogen atoms) by reducing the amount of the hydrochloric acid to 21.9 ml. There is obtained a stable, finely dispersed dispersion.

EXAMPLE 10

The procedure of Example 1 is followed except that the glycerol monostearate is replaced by 19.5 g of N,N-di-N-$\beta$-hydroxyethyl-stearylamine.

EXAMPLE 11

The procedure of Example 1 is followed except for the replacement of the glycerol monostearate by 15.6 g of 1,2-dihydroxy-octadecane. There is obtained a slightly opalescent, light yellow dispersion.

EXAMPLE 12

The procedure of Example 1 is followed up to the reaction with N-methyl-diethanolamine. By the addition of 0.86 g of dimethyl sulfate and a reaction for another 30 minutes at reflux, there occurs a quaternization of the tertiary nitrogen up to 25%. After diluting with 160 ml of technical acetone, 20.4 ml of 2N HCL are added dropwise and the polymer dispersed as in Example 1. As the final product, one obtains a stable, finely divided dispersion with strongly cationic centers represented by the positively charged nitrogen atoms.

EXAMPLE 13

In a Hollander type beater, a cellulosic fibrous material is internally sized, i.e. mass-sized, in a conventional procedure for the production of a cellulosic paper product. As the paper furnish, i.e. the fibrous feed at the wet end of the paper machine, there is used a mixture of 70% bleached spruce cellulose and 30% bleached beech cellulose. To the Hollander, there is further added 1% of a sizing agent, produced according to Example 2. The internal sizing is carried out in one test without the addition of a retention agent and then in another test with about 0.3% of a polyamidoamine as a conventional retention agent. The surface weight of the paper being produced amounts to 70 g/m$^2$. For purposes of comparison, the internal sizing is carried out under exactly the same conditions but with the use of a conventional cationic sizing agent represented by a modified maleic acid anhydride/styrene copolymer, identified hereinafter as the "MA/S" cationic sizing agent.

The sizing degree, the Cobb-value for water and the Cobb-value for a 10% soda solution are measured on the paper produced in each case. The results are summarized in the following table.

TABLE I

| | Sizing Agent | |
|---|---|---|
| | Polyurethane of Ex. 2 | Conventional MA/S |
| Sizing degree (sec) | | |
| Without retention agent | 458 | 140 |
| With 0.3% retention agent | 833 | 190 |
| Cobb-value (water) | | |
| Without retention agent | 27 | 28 |
| With 0.3% retention agent | 23 | 27 |
| Cobb-value (10% soda sol'n.) | | |
| Without retention agent | 20 | 22 |
| With 0.3% retention agent | 19 | 20 |

EXAMPLE 14

An unsized raw paper with a surface weight of 80 g/m² is treated in the sizing press, i.e. the press section of a paper making machine, with a sizing liquor which contains 10% oxidized starch and 0.25% (bone-dry) of the polyurethane sizing agent produced according to Example 2. The paper absorbs 1.85% of (dry) materials, with reference to the weight of the paper, in the sizing press.

Under identical conditions, the surface sizing treatment is also carried out for purposes of comparison with the use of a conventional sizing agent represented, as before, on the basis of a modified maleic acid anhydride/styrene copolymer (MA/S). The values measured on the sized paper are set forth in the following table.

TABLE II

| | Sizing Agent | |
|---|---|---|
| | Polyurethane of Ex. 2 | Conventional MA/S |
| Sizing degree (Hercules - sec.) | 1590 | 310 |
| Cobb-value (water) | | |
| 1 minute | 19 | 26 |

EXAMPLE 15

Using the same method and conditions as in Example 14, the surface sizing is carried out with the only difference being the use of a sizing liquor which contains 5% of the oxidized starch and 0.3% (bone-dry) sizing agent. In the sizing press, the paper takes up 1.8% (dry weight) of the sizing materials. The resulting properties of the sized paper are given in the following table.

TABLE III

| | Sizing Agent | |
|---|---|---|
| | Polyurethane of Ex. 2 | Conventional MA/S |
| Sizing degree (sec) | 4920 | 120 |
| Cobb-value (water) | | |
| 1 minute | 19 | 37 |
| Cobb-value (10% soda sol'n) | | |
| 1 minute | 5 | 27 |

EXAMPLE 16

Using the same method and conditions as in Example 15, the surface sizing is carried out as before but with the use of 0.2% and 0.3% (bone-dry) of the polyurethane sizing agent of Example 1. The properties of the resulting sized paper are given in the following table.

TABLE IV

| | Sizing Agent | |
|---|---|---|
| | 0.2% Polyurethane dispersion of Example 1 | 0.2% MA/S (Conventional) |
| Sizing degree (sec) | 2136 | 218 |
| Cobb-value (water) | | |
| 1 minute | 1 | 47 |
| Cobb-value (10% soda sol'n) | | |
| 1 minute | 17 | 40 |
| | Sizing Agent | |
| | 0.3% Polyurethane dispersion of Example 1 | 0.3% MA/S (Conventional) |
| Sizing degree (sec) | 2602 | 312 |
| Cobb-value (water) | | |
| 1 minute | 19 | 33 |
| Cobb-value (10% soda sol'n) | | |
| 1 minute | 6 | 30 |

EXAMPLE 17

In a Hollander beater, a cellulosic fibrous material is internally sized in a manner generally known for the production of paper on a paper making machine. The paper furnish is composed of a mixture of 75% bleached cellulose sulfite pulp, 15% bleached beech cellulose sulfate pulp and 10% pine cellulose sulfate pulp, which has been beat to a degree of fineness of 40° SR. There is further added to the beater 1% (bone-dry) of the polyurethane sizing agent produced according to Example 1. The surface weight of the paper produced thereby is 45 g/m².

The test results are given in the following table.

TABLE V

| Cobb-value (water) | |
|---|---|
| 1 minute | 14 |
| Cobb-value (10% soda solution) | |
| 1 minute | 13 |

EXAMPLE 18

An unsized raw paper with a surface weight of 80 g/m² is treated in the sizing press of the paper making machine with a sizing liquor which contains only 0.50% (bone-dry) of the polyurethane sizing agent prepared according to Example 1 and is also treated with the same amount of the conventional sizing agent for comparison. The values as measured on the sized paper are summarized in the following table.

TABLE VI

| | Sizing Agent | |
|---|---|---|
| | 0.5% (bone-dry) Polyurethane dispersion of Example 1 | 0.5% (bone-dry) MA/S (Conventional) |
| Cobb-value (water) | | |
| 1 minute | 15 | 21 |
| Cobb-value (10% soda sol'n) | 16 | 21 |

EXAMPLE 19

An unsized raw paper with a surface weight of 80 g/m² is treated in the sizing press with a sizing liquor which contains 5% starch and 0.3% (bone-dry) of the polyurethane sizing agent obtained according to Example 11. The results with a comparison are given in the following table.

TABLE VII

|  | Sizing Agent | |
| --- | --- | --- |
|  | 0.3% Polyurethane of Example 11 | 0.3% MA/S (Conventional) |
| Sizing degree (sec) | 1250 | 300 |
| Cobb-value (water) 1 minute | 17 | 24 |

EXAMPLE 20

Using the same method and conditions as in Example 15, a surface sizing of the paper is carried out but with 0.1%, 0.2% and 0.3% (measured bone-dry) of the polyurethane sizing agent of Example 12 being used. The properties of the sized paper are given in the following table.

TABLE VIII

|  | Sizing Agent | |
| --- | --- | --- |
|  | 0.1% Polyurethane of Example 12 | 0.1% MA/S (Conventional) |
| Sizing degree (sec) | 420 | 55 |
| Cobb-value (water) 1 minute | 90 | 92 |
|  | 0.2% Polyurethane of Example 12 | 0.2% MA/S (Conventional) |
| Sizing degree (sec) | 1840 | 260 |
| Cobb-value (water) 1 minute | 24 | 35 |
|  | 0.3% Polyurethane of Example 12 | 0.3% MA/S (Conventional) |
| Sizing degree (sec) | 3250 | 305 |
| Cobb-value (water) 1 minute | 21 | 30 |

EXAMPLE 21

A surface sizing is carried out using the same method and conditions of Example 14 except that the sizing liquor contains 5% starch and 0.3% of the polyurethane sizing agent obtained as the polymer dispersion of Example 1. For purposes of comparison, the sizing agent is that employed in Example 8 of German patent specification (DOS) No. 1,595,602. The results are summarized in the following table.

TABLE IX

|  | Sizing Agent | |
| --- | --- | --- |
|  | Polyurethane dispersion of Example 1 above | Product of Ex. 8 of DOS 1,595,602 |
| Sizing degree (sec) | 1850 | 229 |
| Cobb-value (water) 1 minute | 19 | 70 |

The invention is hereby claimed as follows:

1. A process for the production of a cationic polyurethane which comprises:
   converting a monomeric aliphatic dihydroxy compound substituted with an aliphatic side-chain of at least 10 carbon atoms, by reaction with a polyisocyanate into a preliminary adduct with terminal —NCO groups; and
   chain-lengthening said adduct by reacting the terminal —NCO groups with
   A. an aliphatic monomeric diol containing a tertiary nitrogen atom which is subsequently converted into the corresponding ammonium compound, or
   B. an aliphatic monomeric diol containing a tertiary nitrogen atom previously converted into the corresponding ammonium compound.

2. A process as claimed in claim 1 wherein said aliphatic side-chain substituent of the dihydroxy compound contains at least 16 carbon atoms.

3. A process as claimed in claim 1 wherein said monomeric aliphatic dihydroxy compound is a glycerol fatty acid monoester.

4. A process as claimed in claim 3 wherein said monoester is glycerol monostearate.

5. A process as claimed in claim 3 wherein said monoester is the behenic acid monoester of glycerol.

6. A process as claimed in claim 1 wherein the monomeric aliphatic dihydroxy compound is one in which the two hydroxy groups are connected by an aliphatic chain of not more than 7 atoms.

7. A process as claimed in claim 6 wherein said aliphatic chain as from 2 to 7 atoms and is selected from the group consisting of alkylene and dialkyleneamine with the side-chain being alkyl connected to a carbon atom of said alkylene or to the nitrogen atom of said dialkyleneamine.

8. A process as claimed in claim 1 wherein said monomeric aliphatic dihydroxy compound is N-stearyl-diethanolamine.

9. A process as claimed in claim 1 wherein said monomeric aliphatic dihydroxy compound is 1,2- or 1,4-dihydroxyoctadecane.

10. A process as claimed in claim 1 wherein hydrogen chloride is used to form the ammonium compound.

11. A process as claimed in claim 1 wherein said aliphatic monomeric diol containing a tertiary nitrogen atom is N-methyl-diethanolamine.

12. A process as claimed in claim 1 wherein said aliphatic monomeric diol containing a tertiary nitrogen atom is 1,2-propanediol-3-dimethylamine.

13. A process as claimed in claim 1 wherein the cationic polyurethane is produced in acetone as a solvent.

14. A process as claimed in claim 1 wherein the chain-lengthened product obtained with the diol (A) is first dried before being converted into said ammonium compound.

15. The cationic polyurethane product obtained by the process of claim 1.

16. A cationic polyurethane consisting essentially of the structural units of the formula

ABAD in which:

A is $\{CO-NH-R-NH-CO\}$,

R being the hydrocarbon radical of a diisocyanate; B is a member selected from the group consisting of

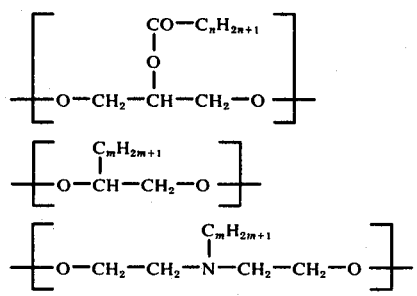
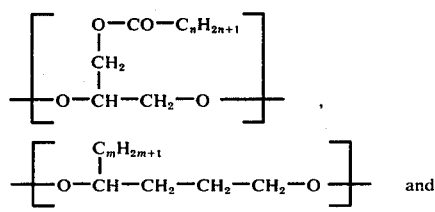

*n* being an integer of from 9 to 21 and *m* being an integer of from 10 to 22; and D is a member selected from the group consisting of

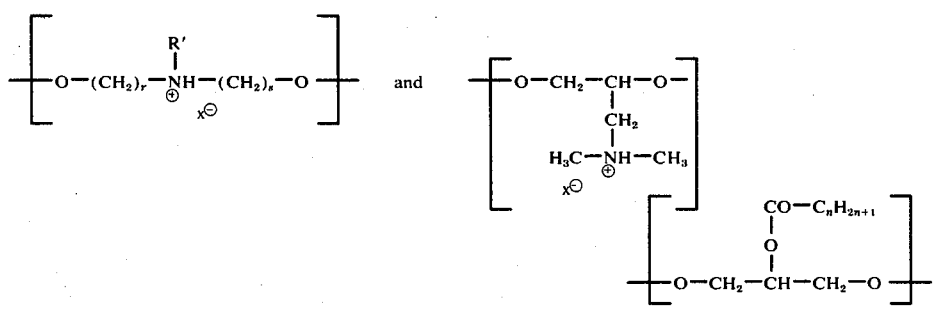

R' being lower alkyl of 1 to 4 carbon atoms, *r* and *s* each being an integer of 2 to 6 and $r+s$ being not more than 6 and $X^{\ominus}$ being the anion of an acid.

17. A cationic polyurethane as claimed in claim 16 wherein *n* is an integer of 15 to 21, *m* is an integer of 16 to 22, and *r* and *s* each denotes an integer of 2 to 3.

18. A cationic polyurethane as claimed in claim 16 wherein R is 2,4- or 2,6-tolylene.

19. A paper sizing composition in which the essential sizing agent is the cationic polyurethane as claimed in claim 16.

20. A cationic polyurethane as claimed in claim 16 having a molecular weight in the range of about 3,000 to 20,000.

21. A cationic polyurethane as claimed in claim 16 wherein the diisocyanate of the radical R consists essentially of a mixture of toluene-diisocyanate - (2,4) and - (2,6), B is the member

*n* being 17, D has the same meaning as given in claim 16.

22. A process for making a cationic polyurethane which comprises reacting a monomeric aliphatic dihydroxy compound substitued with an aliphatic sidechain of at least 10 carbon atoms, an organic polyisocyanate and (1) an aliphatic monomeric diol containing a tertiary nitrogen atom and subsequently converting the tertiary nitrogen atom into the corresponding ammonium compound; or (2) an aliphatic monomeric diol which contains a nitrogen atom which has been converted into the corresponding ammonium compound.

23. The process of claim 22 wherein the said substituted monomeric aliphatic dihydroxy compound has 2 to 7 carbon atoms in its main chain, the organic polyisocyanate is a diisocyanate, and the diol (1) or (2) has only one or two tertiary nitrogen atoms or corresponding ammonium compounds which are in the main chain at a point removed from between the hydroxyl groups.

24. A cationic polyurethane prepared by the process of claim 23.

* * * * *